United States Patent [19]

Schultz et al.

[11] Patent Number: 5,280,159
[45] Date of Patent: Jan. 18, 1994

[54] MAGNETIC RADIO FREQUENCY TAG READER FOR USE WITH A HAND-HELD TERMINAL

[75] Inventors: Darald R. Schultz; Lloyd D. Warner, both of Cedar Rapids, Iowa

[73] Assignee: Norand Corporation, Cedar Rapids, Iowa

[21] Appl. No.: 880,114

[22] Filed: May 7, 1992

Related U.S. Application Data

[63] Continuation-in-part of Ser. No. 321,932, Mar. 9, 1989, abandoned.

[51] Int. Cl.$^5$ .............................................. G06K 5/00
[52] U.S. Cl. .................................... 231/382; 235/380; 235/472
[58] Field of Search ........................ 235/380, 382, 472

[56] References Cited

U.S. PATENT DOCUMENTS 4,501,958 2/1985 Glize .................................. 235/382

*Primary Examiner*—Harold Pitts
*Attorney, Agent, or Firm*—McAndrews, Held & Malloy, Ltd.

[57] ABSTRACT

A magnetic RF tag reader is shown for reading RF tags which transmit information to the receiver when the RF tag is disposed in a low frequency magnetic field. The reader is of a size which can be hand-held and is operatively attached to a separate hand-held terminal for receiving, processing and storing information. The hand-held terminal can be used independently for other purposes when it is not operably connected to the RF tag reader. A regular bar code reader can also be attached to the hand-held terminal means if desired.

14 Claims, 2 Drawing Sheets

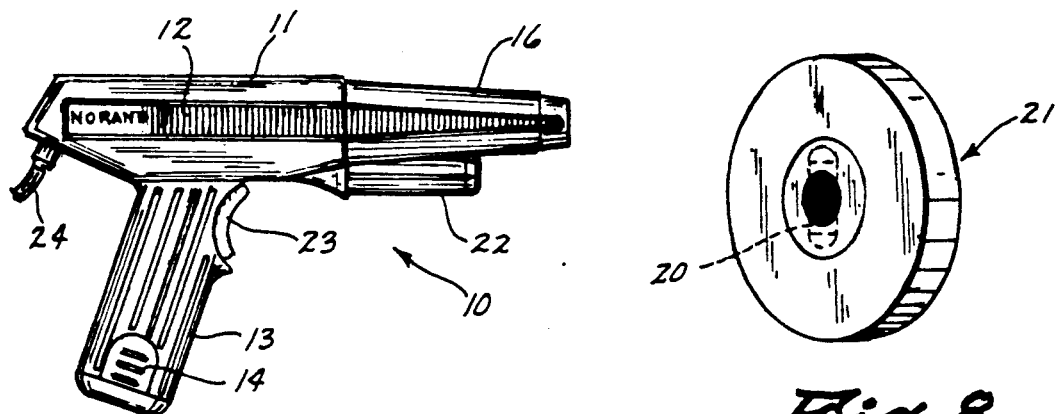
Fig. 7
Fig. 8
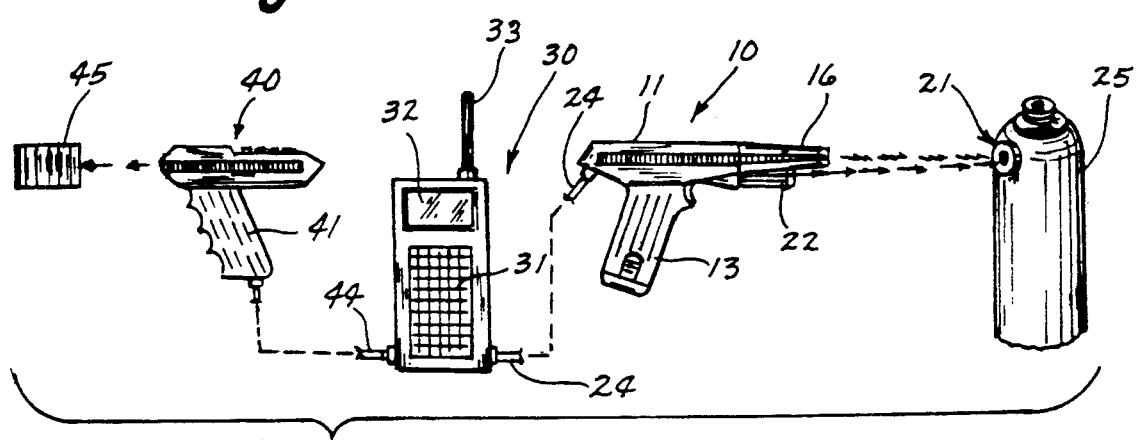
Fig. 10
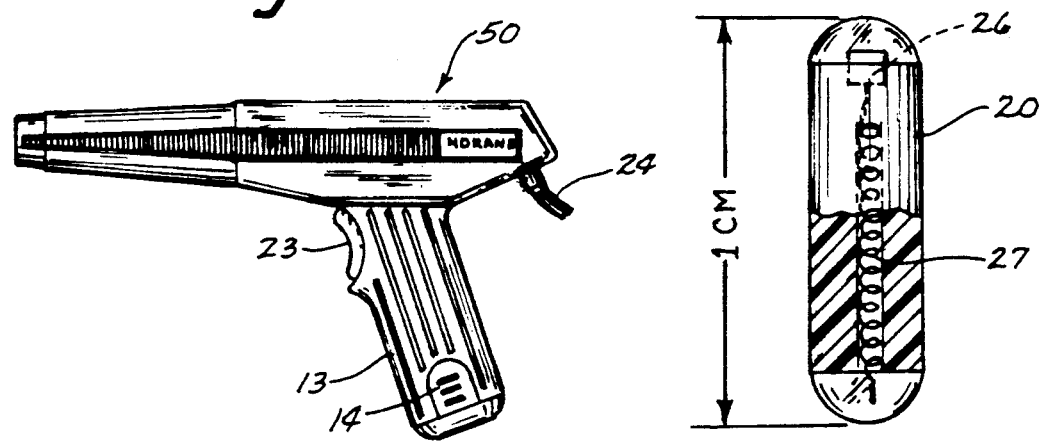
Fig. 11
Fig. 9

MAGNETIC RADIO FREQUENCY TAG READER FOR USE WITH A HAND-HELD TERMINAL

CROSS REFERENCE TO RELATED APPLICATIONS (Claiming Benefit Under 35 U.S.C. 120)

This application is a continuation-in-part application of U.S. Ser. No. 07/321,932, filed Mar. 9, 1989 abandoned.

INCORPORATION BY REFERENCE

The above referred to application is incorporated herein by reference in its entirety and hereby made a part of this application.

TECHNICAL FIELD

The present invention relates generally to a magnetic radio frequency tag reader, and more particularly to such a radio frequency tag reader which can be connected to a hand-held terminal.

BACKGROUND ART

Bar codes are useful for identifying and maintaining inventory for a variety of products and goods. One of the disadvantages of a bar code system is that it may be difficult to read, depending upon the available light, the environment or the angle that the bar code can be scanned. The shapes of bar codes generally need to be somewhat uniform and of course a limitation for bar codes is that they cannot be hidden out of view, but instead must be readily available so that the light from a bar code reader can impinge directly upon the bar code.

Because of some of the limitations of bar codes and bar code readers, passive transponder systems have been developed. There are for example radio frequency electrical transponders which require contact with a reader in order to be read. There are also radio frequency tag magnetic readers in which no contact is required. These magnetic RF tags can be read by a reader which activates an antenna within the RF tag when the RF tag becomes disposed within the magnetic field generated by the RF tag reader. This causes a radio frequency signal to be transmitted which can then be received by the reader.

The magnetic RF tag readers in the prior art are somewhat bulky and have an internal computer disposed therein which is dedicated to the reader itself. The disadvantages of such a reader with a dedicated internal computer is that the computer terminal is not useful for other purposes and the size of the reader makes it very awkward to use, for example it cannot be placed in a normal sized pocket or the like.

DISCLOSURE OF THE INVENTION

The present invention relates generally to a magnetic RF tag reader for reading RF tags which transmit information to the receiver when the RF tag is disposed in a low frequency magnetic field. The reader is of a size which can be hand-held and is operatively attached to a separate hand-held terminal for receiving, processing and storing information. The hand-held terminal can be used independently for other purposes when it is not operably connected to the RF tag reader. A regular bar code reader can also be attached to the hand-held terminal means if desired.

An object of the present invention is to provide an improved magnetic radio frequency reader for reading passive transponders for transmitting information in a radio frequency form to a receiver within the reader when the transponder is disposed in a low frequency magnetic field generated by the RF tag reader.

Another object of the present invention is to provide an improved RF tag reader.

Another object of the present invention is to provide an RF tag reader which is small enough to be placed into a pocket of normal size.

A further object of the present invention is to provide an RF tag reader which can be connected to a computer terminal which is also hand-held and can be used independently for other purposes when desired.

A still further object of the present invention is to provide an RF tag reader, hand-held terminal of the aforementioned type which can alternatively be attached to a bar code reader.

A still further object of the present invention is to provide an RF tag reader of the aforementioned type which includes a laser sight thereon.

Other objects, advantages, and novel features of the present invention will become apparent from the following detailed description of the invention when considered in conjunction with the accompanying drawings.

BRIEF DESCRIPTION OF THE DRAWINGS

FIG. 5 is a partial cross section view of the handle portion of the preferred embodiment shown in FIG. 1, showing the battery compartment therein;

FIG. 7 is a side elevational view similar to FIG. 1;

FIG. 8 is a perspective view of an RF tag which can be connected to products for inventory purposes or the like;

FIG. 9 is an enlarged view of an RF tag or transponder with a partial cross sectional thereof, showing an antenna connected to a chip with identifying information thereon encapsulated in glass or the like;

FIG. 10 is an exploded view showing a hand-held terminal being connected to either one or both of a bar code reader or an RF tag reader as shown in FIG. 7, FIG. 10 showing the RF tag reader reading the tag on a metal tank for holding oxygen or the like; and FIG. 11 is another preferred embodiment of the present invention showing an RF tag reader of the magnetic type without a laser sight thereon.

BEST MODES FOR CARRYING OUT THE INVENTION

Figure 1:
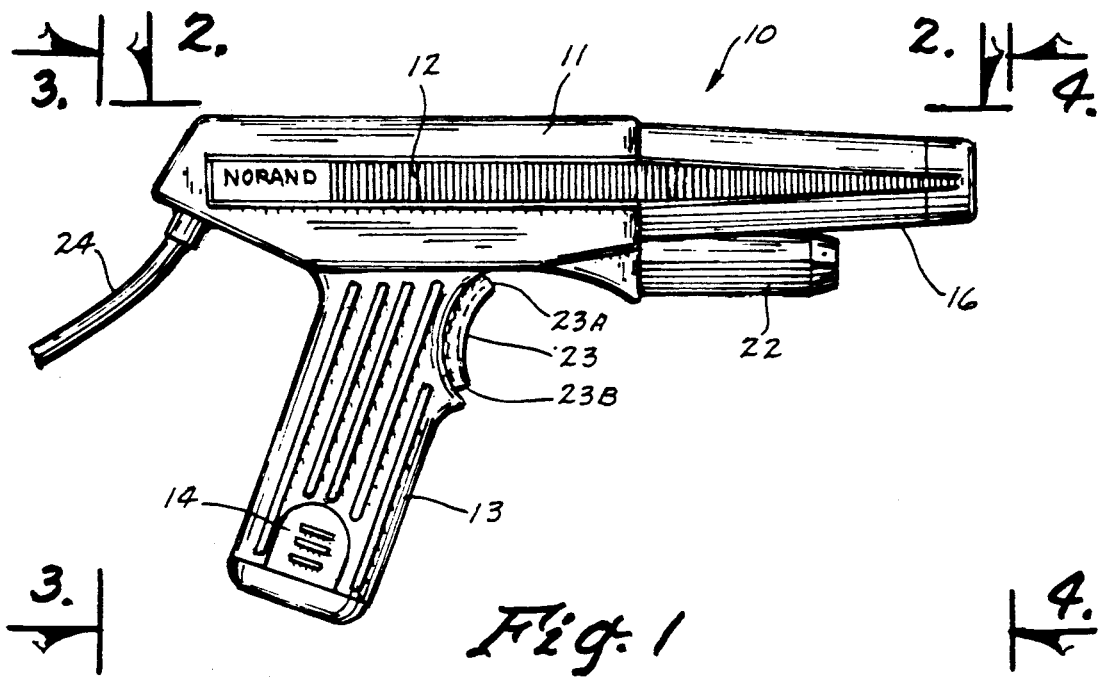
FIG. 1 is a side elevational view of a hand-held RF tag reader, having a laser sight thereon, which is constructed in accordance with the present invention.
Figure 2:
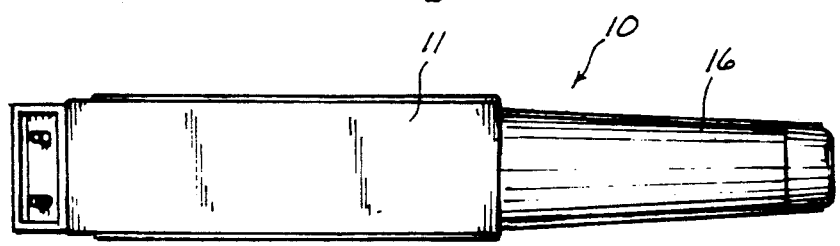
FIG. 2 is a top view taken along line 2—2 of FIG. 1.
Figures 3, 4, 6:
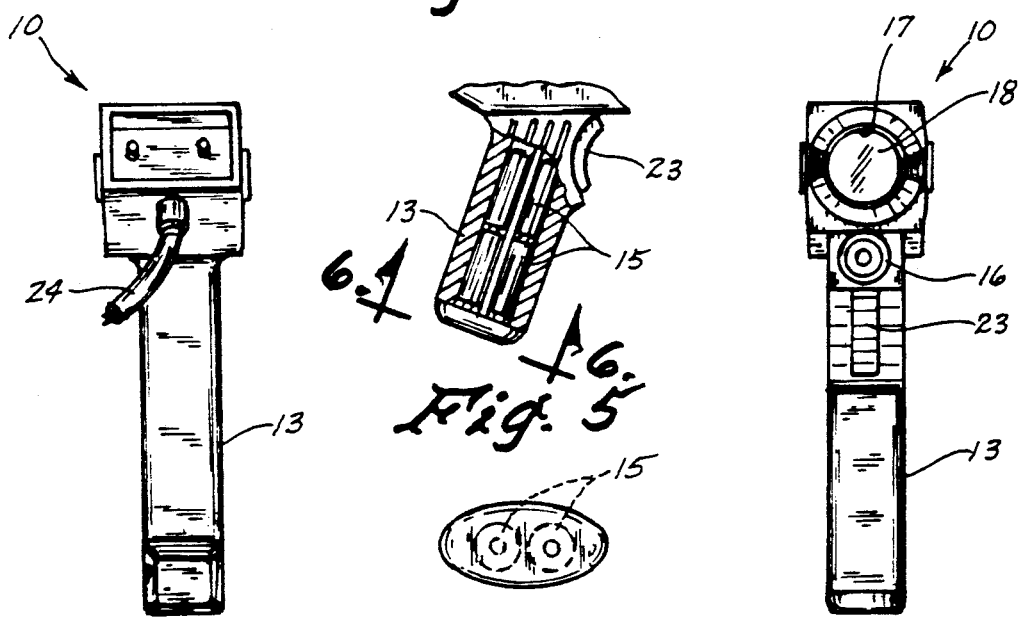
FIG. 3 is a view taken along line 3—3 of FIG. 1.
FIG. 4 is a view taken along line 4—4 of FIG. 1.
FIG. 6 is a view taken along line 6—6 of FIG. 5.

Referring now to the drawings wherein like reference numerals designate identical or corresponding parts throughout the several views, FIG. 1 shows a magnetic RF tag reader (10) constructed in accordance with the present invention and having a main body portion (11) with soft rubber inserts (12) connected to a handle (13). The handle (13) has a battery compartment lid (14) thereon for providing access to batteries (15) shown in FIG. 5. A barrel portion (16) has an opening (17) thereon for providing access to an antenna (18) disposed within the barrel (16). Another antenna is disposed within housing portion (11) and it is essentially an electro-magnet wherein the coils of the antenna, When energized, will cause a magnetic field to energize any passive transponder such as passive transponder (20) shown in FIG. 9 or passive transponder (21) shown in FIGS. 8 and 10.

A laser emitting light source (22) is attached to the barrel (16) for emitting a light concentric with the cylindrical longitudinal axis of the sight housing (22). The trigger (23) can activate the laser sight (22) by pushing on an upper portion (23A) and when the lower portion (23B) is depressed, the laser sight will go off and the magnetic field will be activated.

Referring to FIG. 10, it is noted that the magnetic RF tag reader (10) is tethered to a hand-held computer terminal (30) by tether (24). Similarly, a bar code reader (40), having a handle (41), can be tethered to the handheld terminal (30) by tether (44).

The hand-held terminal (30) which is shown has a keyboard (31), a display screen (32) and a transceiver for receiving or sending radio frequency signals through antenna (33).

In operation, when the hand-held terminal (30) is tethered to the RF tag reader (10), normally the bar code reader would not be attached to the hand-held terminal (30). Consequently, the user can place the hand-held terminal (30) in one pocket, for example into a shirt pocket, and the user can place the hand-held RF tag reader (10) into another pocket, such as into a pants pocket. Then when it is desired to use this combination, the RF tag reader (10) can be grasped and pointed like a firearm or the like toward an RF tag or transponder (21).

The RF tag (21) is shown attached to a metal oxygen tank (25). The top portion (23A) of the trigger (23) would first be depressed and when the laser (22) shines onto the transponder (21), the bottom portion (23B) of the trigger (23) would be activated, which would activate the electro-magnet within the reader (10); and, assuming the reader (10) is close enough to the transponder (21), the RF tag (21) would be activated and would send a radio frequency signal with identifying information from the chip (26) which will be received by the antenna (18). This information received by the antenna (18) will be transmitted to the hand-held terminal (30), which can then store the information, process and transmit it to wherever it is desired, as needed.

The application of the transponder (21) on the metal oxygen tank (25) is but one example of the use of the system shown in FIG. 10. For example, a tank (25) often would have a value several times more than the contents thereof when filled to capacity. Consequently, it becomes extremely important to someone in the business of supplying oxygen or other gas to be able to keep track of and inventory the containers (25) and to inventory and keep track of how often these containers are filled, sent out and received. This can all easily and readily be done with the RF tag reader (10) connected to the terminal (30) shown in FIG. 10.

Another application of the RF tag reader (10) and hand-held terminal (30) is in an industrial laundry situation where a shirt may have one of the RF tags (20) shown in FIG. 9 sewn into the collar or a pair of pants could have the RF tag (20) sewn into the waist or the like. Then these garments could easily be inventoried and tracked when they are issued to a user and when they are laundered. FIG. 11 shows an RF tag reader (50) which is just like the RF tag reader of FIGS. 1-10, except that it does not have the laser sight thereon.

Referring again to FIG. 10, it is noted that the hand-held computer terminal (30) can be used in a normal and well understood fashion, such as by keying in information into the keyboard (31) with both the RF tag reader (10) and the scanner (40) detached therefrom. If it is desired to just use the scanner (40) and not the RF tag reader (10), then of course the RF tag reader is simply detached. In fact, it would be unusual to have both the RF tag reader (10) and the bar code reader (40) attached to the hand-held terminal (30) at the same time, because normally a user is dealing either with RF tags (21) or with bar codes (45) and is probably not dealing with a situation where both types of readers are necessary at the same time.

Accordingly, it will be appreciated that the preferred embodiments shown herein do indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. Apparatus comprising:
    hand held terminal means for receiving, processing and storing information;
    radio frequency receiver means for receiving information;
    transponder means for transmitting information in a radio frequency form to said receiver means when said transponder means is disposed in a low frequency magnetic field;
    magnetic means for selectively emitting a low frequency magnetic field when it is desired to activate said transponder means;
    means for operatively attaching said receiver means to said hand held terminal means; and
    hand held pistol shaped housing means for holding said magnetic means and said radio frequency receiver means whereby said hand held pistol shaped housing means can be pointed at said transponder means, said magnetic means can be activated and said radio frequency receiver means can receive a signal from said transponder means.

2. The apparatus of claim 1 including hand held bar code reader means operatively attached to said hand held terminal means for reading bar code information and transmitting said bar code information to said hand held terminal means.

3. The apparatus of claim 2 wherein said radio frequency receiver means includes a second antenna means disposed within said hand held pistol shaped housing means for receiving radio frequency information from said transponder means.

4. The apparatus of claim 1 wherein said attaching means comprises a tethered connection member connected at one end to said hand held terminal means and at the other end to said hand held pistol shaped housing means.

5. The apparatus of claim 1 including trigger means operatively attached to said hand held pistol shaped housing means for permitting said magnetic means to be activated with one finger of a hand grasping said hand held pistol shaped housing means.

6. The apparatus of claim 5 including laser sight means operatively attached to said hand held pistol shaped housing means for emitting a laser beam of light toward said transponder means to inform the user thereof whether said hand held pistol shaped housing is in a proper orientation with respect to said transponder means for activation of said magnetic means to activate said transponder means and for said radio frequency receiver means to receive a signal from said transponder means.

7. The apparatus of claim 6 wherein said trigger means includes means for selectively activating and deactivating said laser sight means.

8. The apparatus of claim 7 including battery means disposed within said hand held pistol shaped housing means for providing power to said magnetic means and to said radio frequency receiver means.

9. The apparatus of claim 1 including a radio frequency transceiver means for receiving and transmitting information to and from said hand held terminal means.

10. The apparatus of claim 9 including key means for manually entering information into said hand held terminal means.

11. The apparatus of claim 1 wherein said transponder means is of a passive type.

12. A hand-held RF label reader for receiving RF transponder label data from an RF label reader, comprising:
 (a) a generally pistol shaped housing having,
  (1) a barrel,
  (2) a grip depending from said barrel, and
  (3) activating trigger associated with said grip;
 (b) receiver means for receiving RF label data transponder from RF labels, said receiver means associated with the barrel of said housing; and
 (c) means for indicating at least one of two conditions indicative of the quality of the reception of the transponder label data.

13. The reader of claim 12, further comprising means for aiming said receiving means at an RF label.

14. The reader of claim 12, wherein said activating trigger includes means for activating said sight means and means for activating said receiver means.

* * * * *